(12) United States Patent
Tiwari

(10) Patent No.: US 8,773,988 B2
(45) Date of Patent: Jul. 8, 2014

(54) METHOD OF HANDLING COMMUNICATIONS OF LOW PRIORITY DEVICE AND MTC DEVICE IN A WIRELESS COMMUNICATION SYSTEM AND RELATED COMMUNICATION DEVICE

(75) Inventor: Kundan Tiwari, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 265 days.

(21) Appl. No.: 13/283,622

(22) Filed: Oct. 28, 2011

(65) Prior Publication Data

US 2012/0106332 A1 May 3, 2012

Related U.S. Application Data

(60) Provisional application No. 61/407,460, filed on Oct. 28, 2010, provisional application No. 61/477,175, filed on Apr. 20, 2011.

(51) Int. Cl.
*G01R 31/08* (2006.01)

(52) U.S. Cl.
USPC ........................................... 370/230; 370/329

(58) Field of Classification Search
None
See application file for complete search history.

(56) References Cited

U.S. PATENT DOCUMENTS

| | | | |
|---|---|---|---|
| 5,309,501 A * | 5/1994 | Kozik et al. ................. | 455/410 |
| 6,104,929 A | 8/2000 | Josse | |
| 6,711,402 B1 * | 3/2004 | Chelliah et al. ............. | 455/415 |
| 7,346,348 B1 | 3/2008 | Gazzard | |
| 8,463,269 B2 * | 6/2013 | Mubarek et al. ............ | 455/435.3 |
| 2007/0238468 A1 | 10/2007 | Buckley | |
| 2009/0191872 A1 * | 7/2009 | Chatterjee et al. ......... | 455/435.1 |
| 2009/0219816 A1 | 9/2009 | Rezaiifar | |
| 2010/0081435 A1 | 4/2010 | Huang | |
| 2010/0216465 A1 | 8/2010 | Mubarek | |
| 2010/0329343 A1 * | 12/2010 | Wu et al. ................... | 375/240.16 |
| 2012/0106332 A1 * | 5/2012 | Tiwari ......................... | 370/230 |
| 2013/0223369 A1 * | 8/2013 | Nenner et al. .............. | 370/329 |

FOREIGN PATENT DOCUMENTS

| | | |
|---|---|---|
| CN | 1700787 A | 11/2005 |
| CN | 101370177 A | 2/2009 |
| EP | 1962541 A1 | 8/2008 |
| EP | 2291026 A1 | 3/2011 |
| WO | 9859505 A1 | 12/1998 |
| WO | 03063535 A1 | 7/2003 |
| WO | 2010106397 A1 | 9/2010 |

OTHER PUBLICATIONS

European patent application No. 11008649.3, European Search Report mailing date: Jan. 18, 2012.
Nokia Siemens Networks, Nokia, "Clarification of back-off timer usage", 3GPP TSG SA WG2 Meeting #81, S2-105078, Oct. 11-15, 2010, Prague, Czech Republic, XP050462932, p. 1-5.

(Continued)

*Primary Examiner* — Robert Wilson
(74) *Attorney, Agent, or Firm* — Winston Hsu; Scott Margo

(57) ABSTRACT

A method of handling a mobile device in a wireless communication system is disclosed. The mobile device is a low priority device or a machine type communication (MTC) device. The method comprises the mobile device sending an indicator to a network of the wireless communication system during a combined attach procedure, wherein the combined attach procedure comprises a circuit-switched (CS) attach procedure and a packet-switched (PS) attach procedure; and the network forwarding the indicator to a switching center of the wireless communication system.

18 Claims, 5 Drawing Sheets

(56) References Cited

OTHER PUBLICATIONS

NEC, "Randomized back-off times to MTC devices after rejecting their connect requests", 3GPP TSG SA WG2 Meeting #79E (Electronic), TD S2-103187, Jul. 6-13, 2010, Elbonia, XP050458266, p. 1-3.

Nokia Siemens Networks, Nokia, "Rejecting Connection Requests in case of congestion or overload in SGSN/GGSN", 3GPP TSG SA WG2 Meeting #80, S2-103843, Aug. 30-Sep. 3, 2010, Brunstad, Norway, XP050458826, p. 1-3.

European patent application No. 11008649.3, European Search Report mailing date: May 4, 2012.

ETSI TS 123 060 V3.6.0 (Jan. 2001), "Digital cellular telecommunications system (Phase 2+) (GSM); Universal Mobile Telecommunications System (UMTS); General Packet Radio Service (GPRS); Service description; Stage 2(3GPP TS 23.060 version 3.6.0 Release 1999)", XP014007552, cover page+ pp. 1-184.

3GPP TSG SA WG2 Meeting #81 S2-105131 Oct. 11-15, 2010, Prague, Czech Republic (Revision of S2-105049) CR-Form-v9.7 Change Request 23.060 CR 1256 rev 2 Current version:a.1.0, "Clarification of term MS configured for MTC", Oct. 2010, pp. 1-5.

3GPP TSG SA WG2 Meeting #81 S2-105301 Oct. 11-15, 2010, Prague, Czech Republic (Revision of 5284) (merge of 4538+4526+4594+4824+4958+4867+4881) CR-Form-v9.6 Change Request 23.060 CR 1205rev 4 Current version: 10.1.0, "Correction and clarification of usage of low priority and MTC Indicators", Oct. 2010, pp. 1-3.

3GPP TSG-CT WGI Meeting #67 C1-104270 Barcelona, Spain, Oct. 11-15, 2010 was C1-104200 CR-Form-v9.7 Change Request 24.008 CR 1651 rev 2 Current version:10.0.0, "Adding Low Priority Indication and MTC Indication in Attach Request Message", Oct. 2010, pp. 1-8.

3GPP TS 24.008 V10.2.0 (Mar. 2011) Technical Specification 3rd Generation Partnership Project; Technical Specification Group Core Network and Terminals; Mobile radio interface Layer 3 specification; Core network protocols; Stage 3 (Release 10), pp. 1-634.

Office action mailed on Dec. 18, 2013 for the China application No. 201110335648.0, filed Oct. 28, 2011.

\* cited by examiner

METHOD OF HANDLING COMMUNICATIONS OF LOW PRIORITY DEVICE AND MTC DEVICE IN A WIRELESS COMMUNICATION SYSTEM AND RELATED COMMUNICATION DEVICE

CROSS REFERENCE TO RELATED APPLICATIONS

This application claims both the benefit of U.S. Provisional Application No. 61/407,460, filed on Oct. 28, 2010, entitled "Method to communicate the device properties for low priority device or devices configured for machine to machine type communication", and the benefit of U.S. Provisional Application No. 61/477,175, filed on Apr. 20, 2011, entitled "Method to communicate the device properties for low priority device or devices configured for machine to machine type communication", the contents of which are incorporated herein in their entirety.

BACKGROUND OF THE INVENTION

1. Field of the Invention

The present invention relates to a method used in a wireless communication system and related communication device, and more particularly, to a method of handling communications of a low priority device and a machine type communication (MTC) device in a wireless communication system and related communication device.

2. Description of the Prior Art

The 3rd Generation Partnership Project (3GPP) has developed a universal mobile telecommunications system (UMTS) which adopts a wideband code division multiple access (WCDMA) as a wireless air interface. In the UMTS, a radio access network known as a universal terrestrial radio access network (UTRAN) includes multiple Node-Bs (NBs) for communicating with multiple user equipments (UEs). As a successor of a General Packet Radio Service (GPRS) system, the UMTS provides high frequency spectrum utilization, universal coverage, and high-speed multimedia data transmission which are beneficial for the UEs and the NBs of the UMTS. Please note that, the UMTS and the GPRS system can support both a packet-switch (PS) service and a circuit-switch (CS) service, while systems older than the GPRS system support only the CS service.

A long-term evolution (LTE) system supporting the 3GPP Rel-8 standard and/or the 3GPP Rel-9 standard is developed by the 3GPP as a successor of the UMTS, to further enhance performance of the UMTS to satisfy users' increasing needs. The LTE system includes a new radio interface and radio network architecture that provides a high data rate, low latency, packet optimization, and improved system capacity and coverage. In the LTE system, a radio access network known as an evolved UTRAN (E-UTRAN) includes multiple evolved NBs (eNBs) for communicating with multiple UEs.

In above wireless communication systems, a radio access network serves as an intermediate network between a UE and a core network. That is, the UE and the core network communicate with each other via the radio access network. Further, the core network comprises a Serving GPRS Support Node (SGSN), a mobile switching center (MSC), etc. in the UMTS and the GPRS system. On the other hand, the core network comprises a serving gateway, a mobility management entity (MME), etc. in the LTE system for Non Access Stratum (NAS) control.

A machine type communication (MTC) device which can automatically perform predefined jobs and report corresponding results to other devices or servers, can be used in various areas, such as security, tracking and tracing, payment, healthcare, metering, etc. Further, the MTC device preferably reports the corresponding results via a wireless link such that limitation caused by environment is removed. However, the wireless link to be used by the MTC device is needed to be established, and resource required by the wireless link is needed to be allocated. Reuse of existing infrastructures and wireless communication systems become a viable choose for usage of the MTC device. Therefore, the GPRS system, the UMTS and the LTE system developed by the 3GPP which are widely deployed are suitable for the usage of the MTC device.

According to the prior art, a device configured as a MTC device or a low priority device can send a MTC indicator or a low priority indicator, respectively, in a signaling message (e.g. an ATTACH REQUEST or a ROUTING AREA UPDATE) to a network (e.g. a SGSN), for indicating its capability. Then, the network can configure the MTC device or the low priority device according to the received indicator. For example, the network may configure a longer periodic location update or a longer periodic routing update area timer to the MTC device or the low priority device, when the network is in congestion.

Further, when a UE performs a combined attach procedure wherein a packet switched (PS) (e.g. GPRS) attach procedure and a circuit switched (CS) (e.g. non-GPRS) attach procedure are combined with the network supporting Network Mode of Operation (NMO) I, the UE sends the MTC indicator or the low priority indicator to the network (e.g. a SGSN) in an ATTACH REQUEST Message. The network stores the indicator in a GPRS Mobility Management (GMM) context of the UE. Currently, the network does not forward the received indicator to a MSC managing the network and the UE. Hence, the MSC does not know if the UE is a low priority device or is configured as a MTC device or both. Therefore, when the MSC is in congestion, the MSC cannot prioritize the UE due to lack of related information of the UE and the resource management will not be done properly.

On the other hand, when a UE attaches for a PS (e.g. GPRS) service and a CS (e.g. non-GPRS) service and detaches only the PS service, the UE will start a periodic location update timer with a timer value received in a system information message. However, the network cannot configure a longer location update timer to the UE, when the UE detaches only the PS service. The UE will perform a periodic location update according to the periodic location update timer with the timer value received in the system information message, and flexibility for the network to configure the UE is lacked.

Besides, when a UE initiates a combined attach procedure wherein a PS (e.g. GPRS) attach procedure and a CS (e.g. non-GPRS) attach procedure are combined to a PS network (e.g. E-UTRAN or UTRAN/GERAN with NMO I) and a MSC managing the UE and the PS network is in congestion, the MSC rejects the CS attach procedure by sending a rejection cause and a back-off timer to the UE. In this situation, it is not known what the UE should do after receiving the rejection cause and the back-off timer.

SUMMARY OF THE INVENTION

The present invention therefore provides a method and related communication device for handling communications of a low priority device and a machine type communication (MTC) device in a wireless communication system to solve the abovementioned problems.

A method of handling a mobile device in a wireless communication system is disclosed. The mobile device is a low priority device or a machine type communication (MTC) device. The method comprises the mobile device sending an indicator to a network of the wireless communication system during a combined attach procedure, wherein the combined attach procedure comprises a circuit-switched (CS) attach procedure and a packet-switched (PS) attach procedure; and the network forwarding the indicator to a switching center of the wireless communication system.

A method of handling timer reuse for a mobile device in a wireless communication system is disclosed. The mobile device is attached for at least one packet-switched (PS) service and at least one circuit-switched (CS) service provided by a network of the wireless communication system. The method comprises the mobile device starting a first timer according to a value stored for a second timer, when the mobile device performing a detach procedure for the at least one PS service with the network; and the network sending an indication message comprising the value of the second timer to a switching center of the wireless communication system; wherein the mobile device and the network are managed by the switching center.

A method of handling congestion of a switching center of a wireless communication system is disclosed. The method comprises the mobile device initiating a combined procedure for accessing at least one packet-switched (PS) service and at least one circuit-switched (CS) service in the wireless communication system; the switching center sending a response message comprising a rejection cause and a back-off timer to the mobile device to reject the at least one CS service and accept the at least one PS service; and the mobile device starting the back-off timer, after receiving the response message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
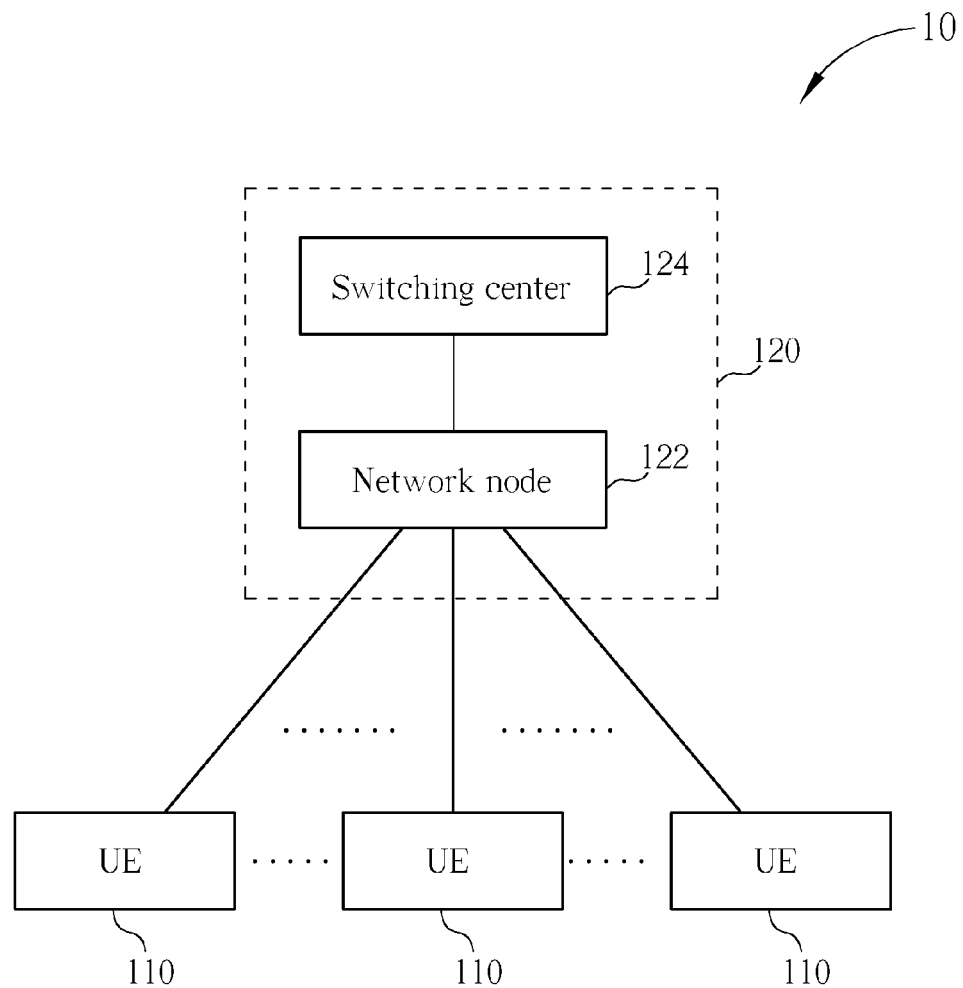
FIG. 1 is a schematic diagram of an exemplary wireless communication system according to the present invention.

Please refer to FIG. 1, which is a schematic diagram of a wireless communication system 10 according to an example of the present invention. The wireless communication system 10 is briefly composed of multiple user equipments (UEs) 110 and a core network 120. The core network 120 may be an evolved packet core (EPC) network or a general packet radio service (GPRS) network of a GPRS system, a universal mobile telecommunications system (UMTS) and/or a long-term evolution (LTE) system, and supports both a packet-switch (PS) service and a circuit-switch (CS) service. Further, the core network 120 includes a network node 122 and a switching center 124. The network node 122 exchanges information and signalings between the UEs 110 and the switching center 124. In the UMTS and the GPRS system, the network node 122 and the switching 124 can be a Serving GPRS Support Node (SGSN) and a mobile switching center (MSC), respectively. In the LTE system, the core network 120 can be a serving gateway and a mobility management entity (MME), respectively.

Besides, when a UE 110 initiates a procedure for acquiring resource or accessing a service with the core network 120, the procedure is processed by both the network node 122 and the switching center 124. Further, part of the procedure is finished at the network node 122, and the other part of the procedure is finished at the switching center 124. In other words, the network node 122 and the switching center 124 share authority for managing the UE 110.

Figure 2:
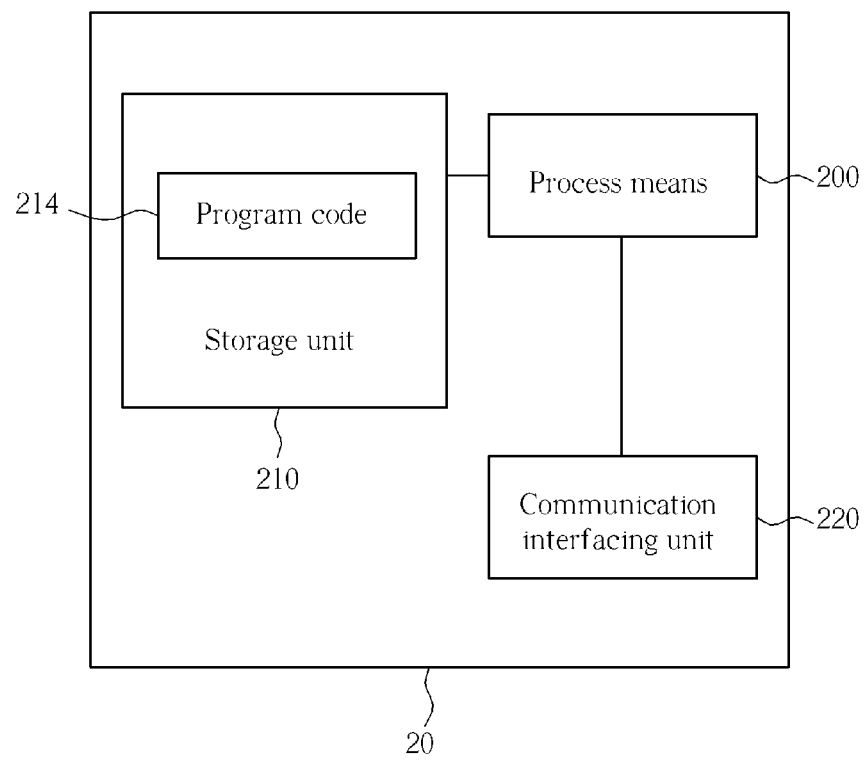
FIG. 2 is a schematic diagram of an exemplary communication device according to the present invention.

Please refer to FIG. 2, which is a schematic diagram of a communication device 20 according to an example of the present invention. The communication device 20 can be the UE, the network node 122 and the switching center 124 shown in FIG. 1, but is not limited herein. The communication device 20 may include a processor 200 such as a microprocessor or an Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a transceiver and can exchange signals/messages in control plane and user plane with the core network according to processing results of the processor 200. Besides, a UE 110 may be manufactured as a low priority device or a machine type communication (MTC) device. Alternatively, a UE 110 may be configured as the low priority device or the MTC device by the core network 120.

Figure 3:
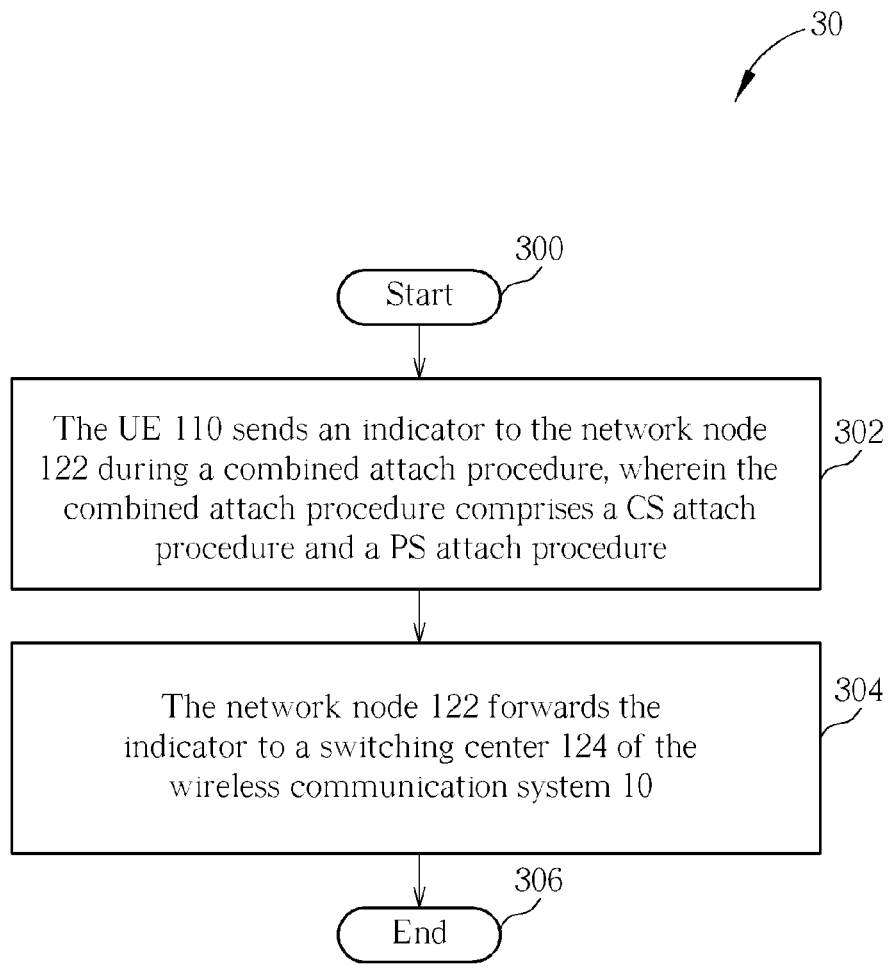
FIG. 3 is a flowchart of an exemplary process according to the present invention.

Please refer to FIG. 3, which is a flowchart of a process 30 according to an example of the present invention. The process 30 is utilized in the wireless communication system 10 shown in FIG. 1, for handing a UE 110 which is manufactured or configured as a low priority device or a MTC device. The process 30 may be compiled into the program code 214 and includes the following steps:

Step 300: Start.

Step 302: The UE 110 sends an indicator to the network node 122 during a combined attach procedure, wherein the combined attach procedure comprises a CS attach procedure and a PS attach procedure.

Step 304: The network node 122 forwards the indicator to a switching center 124 of the wireless communication system 10.

Step 306: End.

According to the process 30, the UE 110 (e.g. a low priority device or a MTC device) can send an indicator to the network node 122 (e.g. a SGSN) during a combined attach procedure, wherein the combined attach procedure comprises a CS attach procedure and a PS attach procedure. For example, the indicator can be included in an ATTACH REQUEST or a ROUTING AREA UPDATE REQUEST message. Then, the network node 122 forwards the indicator to the switching center 124 of the wireless communication system 10. After the switching center 124 receives the indicator, the switching center 124 has information about the UE 110, and can take correct action on the UE 110 when the switching center 124 is in congestion. Comparing with the network node 122 in the prior art does not forward the indicator to the switching center 124, and the switching center 124 may take wrong action on the UE 110, the present invention helps the switching center 124 to take correct action on the UE 110.

In detail, the switching center 124 can reject the CS attach procedure of the combined attach procedure, when the switching center 124 is in congestion. A way according to which the switching center 124 rejects the CS attach procedure is not limited. For example, the switching center 124 sends a response message (e.g. a BSSAP+-LOCATION-UP-DATE-REJECT message) corresponding to the CS attach procedure to the network node 122, and the response message includes a rejection cause and a back-off timer. After receiving the response message sent by the switching center 124, the network node 122 sends a rejection message (e.g. an ATTACH REJECT message or a ROUTING AREA REJECT message) including the rejection cause and the back-off timer to the UE 110. After receiving the rejection message sent by the network node 122, the UE 110 starts the back-off timer and stops retrying the CS attach procedure before the back-off timer expires. In other words, the switching center 124 uses the rejection cause to reject the CS attach procedure initiated by the UE 110, and uses the back-off timer to indicate the UE 110 not to initiate the CS attach procedure again before the back-off timer stops running.

On the other hand, the switching center 124 may send a first response message (e.g. a BSSAP+-LOCATION-UPDATE-ACCEPT message) corresponding to the CS attach procedure of the combined attach procedure to the network node 122, and the first response message includes an extended location update timer. After receiving the first response message sent by the switching center 124, the network node 122 sends a second response message (e.g. an ATTACH ACCEPT message or a ROUTING AREA UPDATE ACCEPT message) including the extended location update timer to the UE 110. After receiving the second response message, the UE 110 stores the extended location update timer, and calculates a new location update period according to system information received in the wireless communication 10 and the extended location update timer. When the UE 110 only performs a PS detach procedure for detaching at least one PS service, the UE 110 performs a location update procedure according to the new location update period. That is, the UE 110 performs the location update procedure, after the new location update period expires.

Besides, when the UE 110 only performs a PS detach procedure for detaching at least one PS service, the network node 122 forwards the indicator (e.g. in a BSSAP+-GPRS-DETACH-INDICATION message) to the switching center 124, for indicating the switching center 124 to update status of the UE 110. After receiving the indicator, the switching center 124 replies an acknowledgement message (e.g. a BSSAP+-GPRS-DETACH-ACK message) corresponding to the indicator to the network node 122, and the acknowledgement message includes an extended periodic location update timer value. Then, the network node 122 sends a detach accept message including the extended periodic location update timer value to the UE 110. After receiving the detach accept message, the UE 110 calculates a periodic location update timer according to a periodic timer value included in system information received in the wireless communication 10 and the extended periodic location update timer value. Then, the UE 110 starts the periodic location update timer, and performs a location update procedure, after the periodic location update timer expires.

Therefore, according to the above illustration and the process 30, the network node 122 forwards an indicator received from the UE 110 to the switching center 124. Since the indicator includes information about the UE 110, e.g. manufactured or configured a low priority device or a MTC device, the switching center 124 can properly configure or control the UE 110, e.g., when the switching center 124 is in congestion or when the UE performs a CS detach procedure. Therefore, the present invention solves the problem that a switching center according to the prior art may take wrong action on a UE due to lack of information of the UE. Resource can be arranged properly, and congestion of the switching center 124 will not be deteriorated due to the wrong action.

Figure 4:
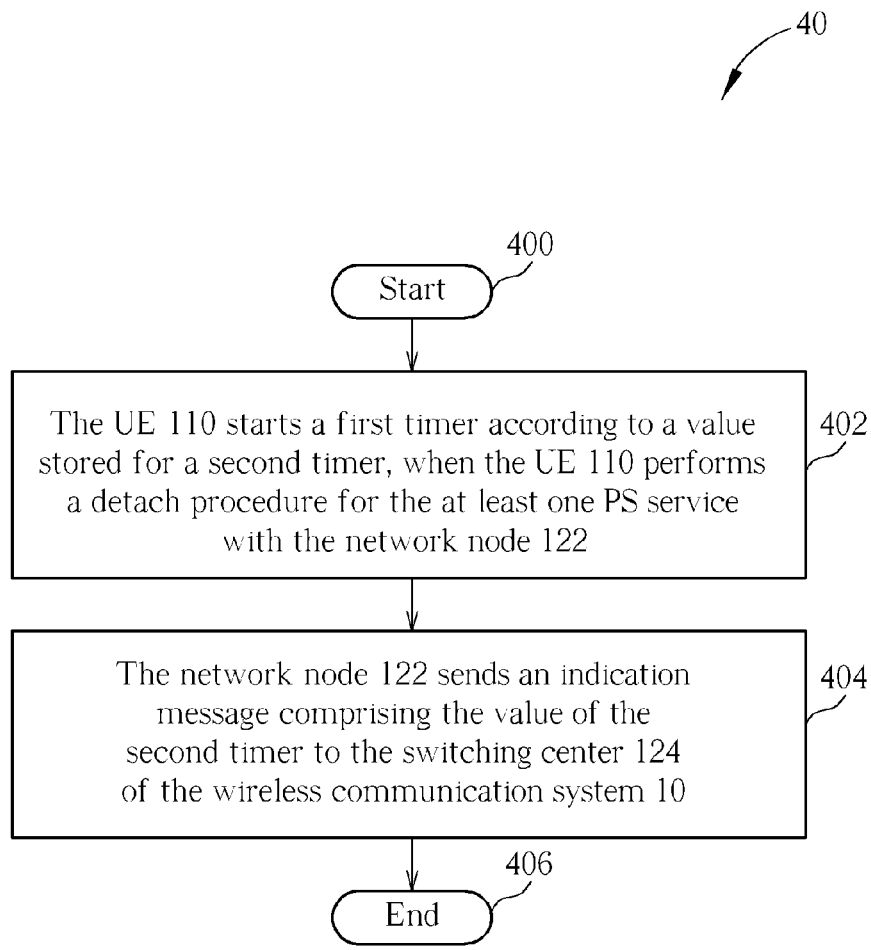
FIG. 4 is a flowchart of an exemplary process according to the present invention.

Please refer to FIG. 4, which is a flowchart of a process 40 according to an example of the present invention. The process 40 is utilized in the wireless communication system 10 shown in FIG. 1, for handing timer reuse for a UE 110. The UE 110 is attached for at least one PS service and at least one CS service. The process 40 may be compiled into the program code 214 and includes the following steps:

Step 400: Start.

Step 402: The UE 110 starts a first timer according to a value stored for a second timer, when the UE 110 performs a detach procedure for the at least one PS service with the network node 122.

Step 404: The network node 122 sends an indication message comprising the value of the second timer to the switching center 124 of the wireless communication system 10.

Step 406: End.

According to the process 40, when the UE 110 (e.g. a low priority device or a MTC device) performs a detach procedure for the at least one PS service (e.g. GPRS service) from the network node 122 (e.g. a SGSN), the UE 110 starts a first timer (e.g. a periodic location update timer T3212) according to a value stored for a second timer (e.g. a periodic routing update timer T3312). Then, the network node 122 sends an indication message (e.g. a BSSAP GPRS DETACH INDICATION message) including the value of the second timer to the switching center 124 (e.g. a MSC) of the wireless communication system 10. Therefore, even though the UE 110 does not have a value for the first timer yet, the UE can use the value for the second timer instead.

Therefore, according to the above illustration and the process 40, when a UE 110 performs a detach procedure for the at least one PS service, the UE 110 needs to start a timer. In this situation, if the UE 110 does not have a value for the timer, the UE 110 will use a value of another timer instead of not starting the timer. Besides, the value used for the timer is sent to the switching center 124 such that the switching center 124 can take correct action on the UE.

Figure 5:
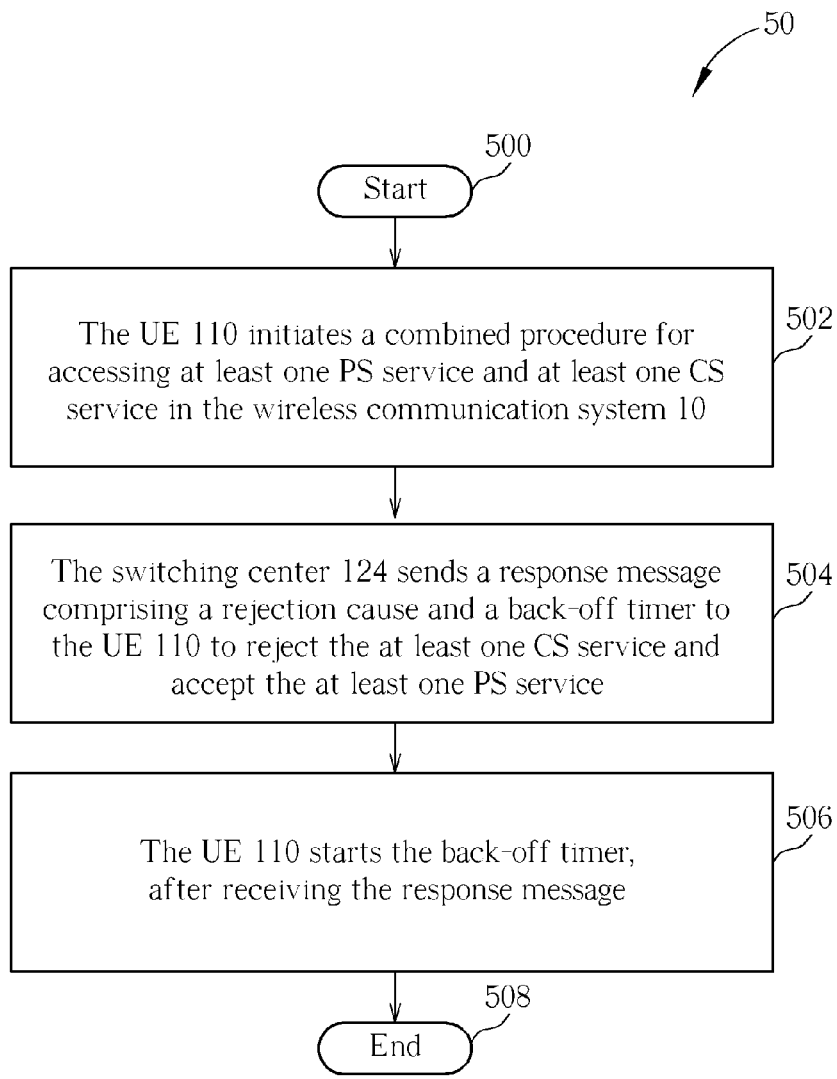
FIG. 5 is a flowchart of an exemplary process according to the present invention.

Please refer to FIG. 5, which is a flowchart of a process 50 according to an example of the present invention. The process 50 is utilized in the wireless communication system 10 shown in FIG. 1, for handing congestion of the switching center 124. The process 50 may be compiled into the program code 214 and includes the following steps:

Step 500: Start.

Step 502: The UE 110 initiates a combined procedure for accessing at least one PS service and at least one CS service in the wireless communication system 10.

Step 504: The switching center 124 sends a response message comprising a rejection cause and a back-off timer to the UE 110 to reject the at least one CS service and accept the at least one PS service.

Step 506: the UE 110 starts the back-off timer, after receiving the response message.

Step 508: End.

According to the process 50, after the UE 110 (e.g. a low priority device or a MTC device) initiates a combined procedure for accessing at least one PS service and at least one CS service in the wireless communication system 10, the switching center 124 sends a response message (e.g. a NAS response message indicating ATTACH ACCEPT) comprising a rejection cause and a back-off timer to the UE 110 to reject the at least one CS service and accept the at least one PS service since the switching center 124 is in congestion. Then, the UE 110 starts the back-off timer, after receiving the response message.

Please note that, the combined procedure is a combined attach procedure or an combined update procedure; wherein the wireless communication system 10 is the LTE system comprising an E-UTRAN, or the UMTS comprising an UTRAN or a GSM EDGE Radio Access Network (GERAN) with a Network Mode of Operation I (NMO I). Alternatively, the combined procedure is a CS attach procedure for accessing the at least one CS service; wherein the wireless communication system 10 is the UMTS comprising an UTRAN or a GERAN with a NMO II. Besides, the back-off timer may be used by the UE 110 in following ways. For example, the UE 110 stops initiating a procedure for CS service with the switching center 124, before the back-off timer expires. Alternatively, the UE 110 stops initiating a CS fallback (CSFB) procedure with the switching center 124 when the UE 110 is in the E-UTRAN, before the back-off timer expires. However, when the UE 110 needs to access an emergency service with the switching center 124, the UE can still initiate a CSFB procedure regardless of the back-off timer.

Therefore, according to the above illustration and the process 50, when the switching center 124 is in congestion, the switching center rejects a combined procedure initiated by a UE 110 with a rejection cause and a back-off timer. Before the back-off timer expires, the UE 110 is not allowed to initiate a procedure for the at least one CS service or a CSFB procedure with the switching center 124 such that the congestion of the switching center will not be deteriorated.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, when a UE is manufactured or configured as a low priority device or a MTC device, the present invention provide methods for a switching center (e.g. a MSC) which is in congestion, to handle an attach procedure or an routing/location update procedure initiated by the UE. More specifically, information relate to the UE must be forwarded by a network node (e.g. a SGSN) to the switching center such that the switching center can correctly handle the attach procedure or the routing/location update procedure. Accordingly, resource can be arranged properly, and congestion of the switching center will not be deteriorated due to taking wrong action on the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling an indicator transmitted by a mobile device in a wireless communication system, the method comprising:
   sending an indicator by the mobile device which is a low priority device or a machine type communication (MTC) device to a network of the wireless communication system during a combined attach procedure, wherein the combined attach procedure comprises a circuit-switched (CS) attach procedure and a packet-switched (PS) attach procedure;
   forwarding the indicator by the network to a switching center of the wireless communication system; and
   rejecting the CS attach procedure of the combined attach procedure by the switching center, when the switching center is in congestion.

2. The method of claim 1, wherein rejecting the CS attach procedure of the combined attach procedure by the switching center, when the switching center is in the congestion comprises:
   sending a response message corresponding to the CS attach procedure by the switching center to the network, and the response message comprising a rejection cause and a back-off timer; and
   sending a rejection message comprising the rejection cause and the back-off timer by the network to the mobile device, after receiving the response message.

3. The method of claim 2, further comprising:
   starting the back-off timer and stopping retrying the CS attach procedure by the mobile device before the back-off timer expires, after receiving the rejection message.

4. The method of claim 1, further comprising:
   sending a first response message corresponding to the CS attach procedure of the combined attach procedure by the switching center to the network, and the first response message comprising an extended location update timer; and
   sending a second response message comprising the extended location update timer by the network to the mobile device, after receiving the first response message.

5. The method of claim 4, further comprising:
   storing the extended location update timer by the mobile device, after receiving the second response message;
   calculating a new location update period by the mobile device according to system information received in the wireless communication system and the extended location update timer; and
   performing a location update procedure by the mobile device according to the new location update period, when the mobile device only performs a PS detach procedure for detaching at least one PS service.

6. The method of claim 1, wherein forwarding the indicator by the network to the switching center of the wireless communication system comprises:
   forwarding the indicator by the network to the switching center for indicating the switching center to update status of the mobile device, when the mobile device only performs a PS detach procedure for detaching at least one PS service.

7. The method of claim 6, further comprising:
   sending an acknowledgement message corresponding to the indicator by the switching center to the network and the acknowledgement message comprising an extended periodic location update timer value, after receiving the indicator; and
   sending a detach accept message comprising the extended periodic location update timer value by the network to the mobile device.

8. The method of claim 7, further comprising:
   calculating a periodic location update timer by the mobile device according to a periodic timer value comprised in system information received from the network and the extended periodic location update timer value, after receiving the detach accept message; and starting the periodic location update timer by the mobile device.

9. The method of claim 1, wherein the network comprises a Serving GPRS Support Node (SGSN), and the switching center is a mobile switching center (MSC).

10. A method of handling timer reuse for a mobile device in a wireless communication system, the mobile device being attached for at least one packet-switched (PS) service and at least one circuit-switched (CS) service provided by a network of the wireless communication system, the method comprising:

starting a first timer by the mobile device according to a value stored for a second timer, when the mobile device performs a detach procedure for the at least one PS service with the network and a value for the first timer is not available at the mobile device; and sending an indication message comprising the value of the second timer by the network to a switching center of the wireless communication system.

11. The method of claim 10, wherein the first timer is a periodic location update timer T3212 described in the 3rd Generation Partnership Project (3GPP) standards, and the second timer is a periodic routing update timer T3312 described in the 3GPP standards.

12. The method of claim 10, wherein the network comprises a Serving GPRS Support Node (SGSN), and the switching center is a mobile switching center (MSC).

13. A method of handling congestion of a switching center of a wireless communication system, the method comprising:

initiating a combined procedure by the mobile device for accessing at least one packet-switched (PS) service and at least one circuit-switched (CS) service in the wireless communication system;

sending a response message comprising a rejection cause and a back-off timer by the switching center to the mobile device to reject the at least one CS service and to accept the at least one PS service; and starting the back-off timer by the mobile device, after receiving the response message.

14. The method of claim 13, wherein the combined procedure is a combined attach procedure or an combined update procedure; wherein the wireless communication system is a long term evolution (LTE) system comprising an evolved universal terrestrial radio access network (E-UTRAN), or the wireless communication system is an universal mobile telecommunications system (UMTS) comprising an UTRAN or a GSM EDGE Radio Access Network (GERAN) with a Network Mode of Operation I (NMO I).

15. The method of claim 13, wherein the combined procedure is a CS attach procedure for accessing the at least one CS service; wherein the wireless communication system is a UMTS comprising an UTRAN or a GERAN with a NMO II.

16. The method of claim 13, further comprising:

stop initiating a procedure by the mobile device for CS service with the switching center, before the back-off timer expires.

17. The method of claim 13, further comprising:

stopping initiating a CS fallback (CSFB) procedure by the mobile device with the switching center when the mobile device is in an E-UTRAN, before the back-off timer expires.

18. The method of claim 17, further comprising:

initiating a CSFB procedure by the mobile device for accessing an emergency service with the switching center.

* * * * *